United States Patent

[11] 3,596,878

| [72] | Inventor | Edward M. Parsen<br>Box 1061, Pierre, S. Dak. 57501 |
|---|---|---|
| [21] | Appl. No. | 861,615 |
| [22] | Filed | Sept. 29, 1969 |
| [45] | Patented | Aug. 3, 1971 |

[54] CABLE GRIPPING TOWING DEVICE
7 Claims, 4 Drawing Figs.

[52] U.S. Cl. .................................................... 254/134.3
[51] Int. Cl. .................................................... E21c 29/16
[50] Field of Search .......................................... 254/134.3,
134.3 CL; 212/108, 110, 122; 24/134, 254; 256/51

[56] References Cited
UNITED STATES PATENTS

| 977,929 | 12/1910 | Cawley ........................ | 212/108 |
|---|---|---|---|
| 1,041,683 | 10/1912 | Schaffer ....................... | 254/134.6 |
| 3,110,480 | 11/1963 | Eitel ............................ | 254/134.3 |
| 3,163,903 | 1/1965 | Knaebe ........................ | 254/51 |

FOREIGN PATENTS

| 505,064 | 8/1930 | Germany ....................... | 212/122 |

*Primary Examiner*—Robert C. Riordon
*Assistant Examiner*—Roscoe V. Parker, Jr.
*Attorneys*—Clarence A. O'Brien and Harvey B. Jacobson ABSTRACT: A cable tow device adapted to ride on a messenger cable is pulled along by a groundman's towrope. The device is provided with means for securing a number of signal cables thereto. Releasable one-way locking means mounted on the device automatically clamps it to the messenger cable whenever the towrope is slackened to prevent reverse movement.

Patented Aug. 3, 1971 3,596,878
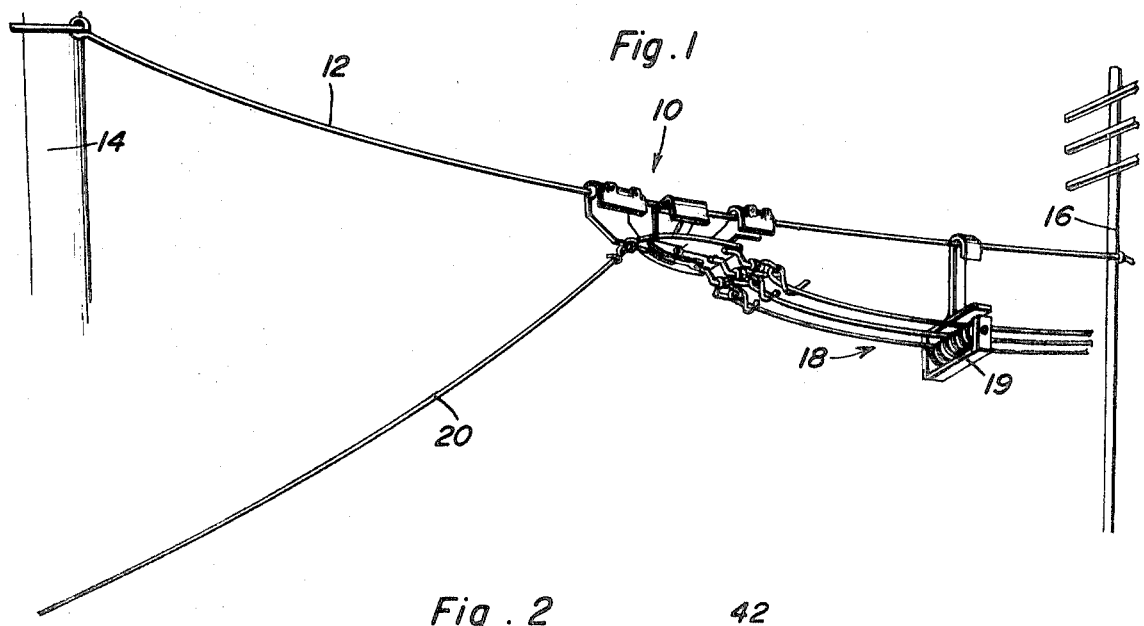
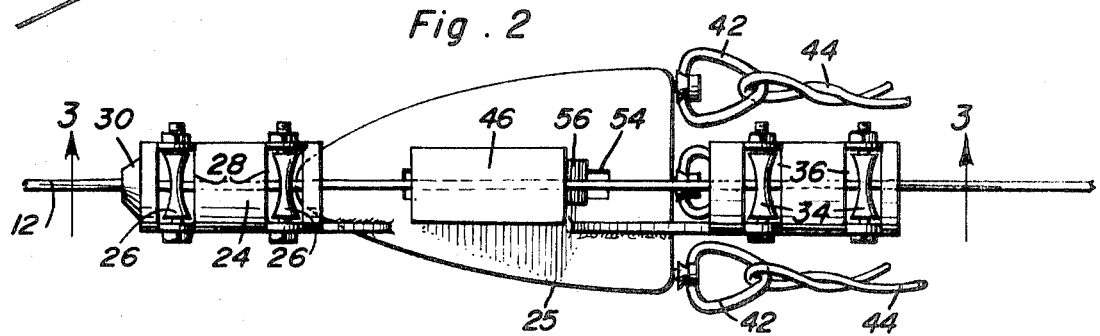
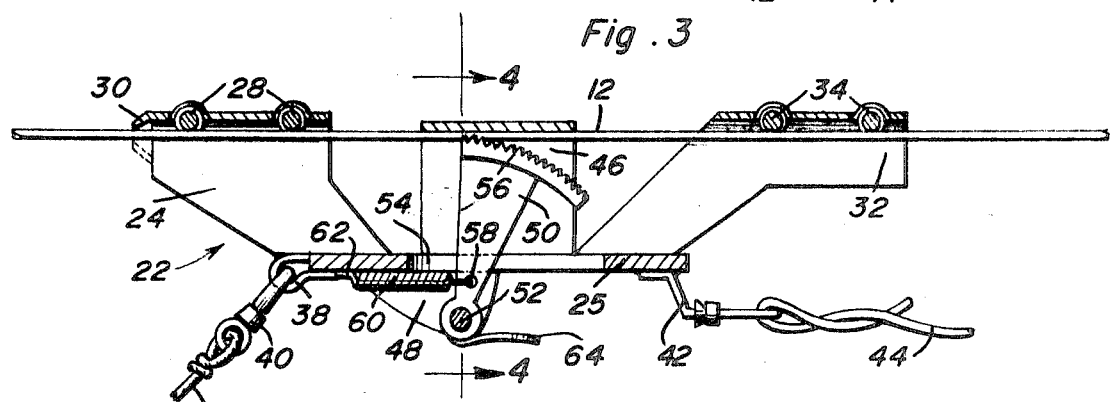
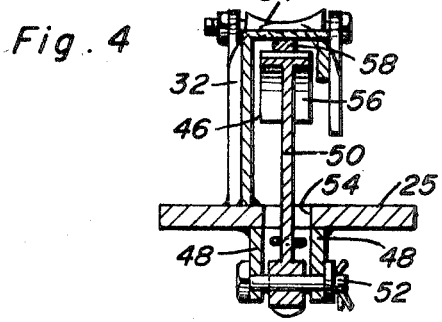
Edward M. Parsen
INVENTOR.

CABLE GRIPPING TOWING DEVICE

The present invention relates to cable stringing equipment and more particularly to a cable tow device.

A conventional procedure for stringing a signal or communication cable between utility poles includes the initial step of fastening a support strand or messenger cable between a series of adjacent poles. A cable two carriage attached to the leading end of a signal cable is pulled along the messenger cable thereby carrying the signal cable between adjacent poles in preparation for lashing to the messenger cable. As the signal cable is strung, intermediate portions of the cable are supported between poles by stringing blocks as disclosed in U.S. Pat. No. 3,185,444 to J. M. Eitel, issued May 25, 1965.

One problem encountered in the foregoing cable stringing operation is the backward displacement of the signal cable when an associated towrope is slackened. The rearward displacement results from the weight of the attached signal cables. As a result of backward travel, sagging portions are formed at points over stringing blocks often forming kinks. Once the tow carriage resumes forward travel, the kinks are stretched to form permanent deformations in the signal cable. This deformation can cause physical damage to the cable which would require subsequent maintenance or replacement. Particularly in the case where such a cable is fabricated in the form of coaxial cable, permanent kinks along the length thereof form stray inductance which adversely affects the transmission of high frequency signals.

In the past, certain devices have been equipped with clamping members which brake the towing carriage at a particular point along the messenger cable. Generally, this is desirable in the vicinity of a utility pole. These clamping devices are sometimes referred to as a "come along" which is of a conventional construction and described in U.S. Pat. No. 3,110,480, issued Nov. 12, 1963 to J. M. Eitel. However, these clamping devices are not automatic and do not operate upon the carriage when the towrope is inadvertently slackened. Unfortunately, when operation of these prior art clamping devices is necessary, along a central span of messenger cable, an aerial lift must be made available so that the device can be manually set.

The present invention includes an automatic brake device which prevents the tow device from traveling backwardly when inadvertent slack on an attached towrope occurs. The device is fabricated from a framework having cable embracing flanges with mounting rollers which easily engage a messenger cable during insertion and removal from the messenger cable. When the present invention is utilized with a signal cable supply spool which feeds the signal cables under tension, sagging of the signal cables during stringing is prevented thereby resulting in an efficient stringing operation without the possibility of cable damage or kinking which does occur when using prior art devices, as previously explained.

By utilizing the present tow carriage, it is simple to slacken the towrope and disconnect it at the lower end for passing the free end through or around trees, shrubbery or over obstructions such as buildings or around the off-street or the back side of poles.

The invention also makes it convenient to pass poles on adjacent spans. During such movement, a stringing lock is set forward of the pole and the towrope is temporarily placed therein. The tow carriage is removed under towrope tension and moved around the pole as the towrope moves forward through the stringing block then reset, still under towrope tension, on the forward side of the pole. The towrope is removed from the stringing block which is removed from the messenger cable so that the towrope can again be advanced. Comparison of the simple procedure should be made with the aforementioned U.S. Pat. No. 3,185,444 in which a complicated clamping device is shown being used to go around a pole.

The reverse movement arrest feature of the invention is also helpful in preventing excess sag over previously crossed streets and thoroughfares which can be hazardous to traffic.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view illustrating the disposition of the present invention on a messenger cable.

FIG. 2 is a top plan view of the tow device as it rides along a messenger cable.

FIG. 3 is a longitudinal sectional view taken along a plane passing through section line 3–3 of FIG. 2.

FIG. 4 is a transverse sectional view taken along a plane passing along section line 4–4 of FIG. 3.

Referring to the drawings and more particularly to FIG. 1 thereof there will be seen a cable tow device generally indicated by reference numeral 10 which is illustrated as riding along a messenger cable or supporting strand 12, connected at opposite ends thereof between utility poles 14 and 16, in a conventional manner. The purpose of the tow device 10 is to assist in stringing one or a plurality of signal or communication cables 18 between the utility poles. As seen in FIG. 1, the leading ends of the signal cables are attached to the device which is moved along the messenger cable to unwind the signal cables 18 from a spool (not shown) and span the distance between the utility poles. Actual support of the signal cables 18 by the messenger cable 12 is accomplished later by conventional lashing techniques. The signal cables are supported at several points between spans by stringing blocks 19. This technique is standard and is disclosed in the aforementioned U.S. Pat. No. 3,185,444 to Eitel. The device 10 is connected to a towrope 20 which may be pulled by a groundman or draft vehicle.

Referring to FIGS. 2—4, the particular structure of the device 10 is seen to include a wheeled framework generally indicated by numeral 22 which comprises a forward cable embracing flange 24 taking the form of an inverted channel member. One leg of the flange is suitably attached at right angles to a sole-shaped baseplate 25, at the forward end portion thereof. The web portion of flange 24 includes two aligned and spaced rectangular slots 28. A roller 26 is disposed across each of the slots. As noted in FIGS. 2 and 3, the underside of the rollers engage the messenger cable 12. The forward end of flange 24 is fashioned in the form of a slotted nozzle-type guide element 30 which tangentially aligns the messenger cable 12 with the axially intermediate portions of the rollers 26.

A rear flange 32, similar to flange 24, is fastened along one leg thereof to the rearward portion of the sole-shaped baseplate member 25. Rectangular slots 36 and rollers 34 are associated with rear flange 32. Thus, by means of the flanges 24 and 32, the device 10 is supported along the forward and backward ends thereof.

Referring to FIG. 3, a shackle 38 is suitably attached to the baseplate member 25 and extends forwardly therefrom. The purpose of the shackle is to permit the attachment of a swivel connector 40 thereto. The swivel connector in turn attaches to the upper end of towrope 20.

A plurality of swivel connectors 42 are suitably attached to the rearward undersurface of the baseplate member 25. These connectors permit the securement of a number of signal cables 44 thereto.

A third cable embracing flange 46 is shown in FIGS. 2 and 3 for engagement with the messenger cable 12 intermediate the forward and rearward flanges 24 and 32. This intermediate flange is fashioned as an inverted channel member having the lower edge of one leg portion suitably attached to the central portion of the baseplate member 25, as seen in FIG. 4. Beside acting as additional cable-engaging support, the flange 46 provides a bearing surface along the bight portion thereof which cooperates with a one-way locking means for clamping the messenger cable, as hereinafter explained.

Two parallel spaced flanges 48 extend downwardly from the underside of baseplate member 25 and provide a clevis for pivotal arm 50 of a gripping element. A clevis pin 52 connects the pivotal arm 50 between the flanges 48 and as will be noted from FIGS. 3 and 4, the intermediate portion of pivotal arm 50 is free to move within a slot 54 formed in the central portion of the baseplate member 25. The upper edge of the pivotal arm 50 integrally mounts an arcuate, serrated rim 56 which is adapted to engage the undersurface of messenger cable 12. It is noted that the circumferential portion of the serrated element 56 is not tangential to the bight portion of flange 46 but rather, is adapted to engage and wedge against the bight portion of the intermediate flanges when messenger cable 12 is not in an interposing relation. An aperture 58 is formed in a lower portion of pivotal arm 50, the aperture receiving one end of a coil spring 60 which lies in juxtaposition with the undersurface of the baseplate member 25. The opposite end 62 of the spring is suitably attached to the undersurface of the baseplate member by means of welding or the like. Thus, the spring 60 forms a means for biasing the pivotal arm 50 and the attached serrated element 56 in a locking direction lightly clamping messenger cable 12.

During the stringing of signal or communication cables 18, the element 56 being in contact with messenger cable 12 is angularly displaced clockwise as viewed in FIG. 3 against the bias of spring 60 during forward motion of the device 10 under the pull of towrope 20. However, when the towrope 20 is slackened, it is desirable that backward motion or displacement of the device be arrested. This is accomplished in the present invention by means of clamping or wedging engagement between serrated element 56 and messenger cable 12 in response to any reverse movement of the device.

As will be appreciated by viewing FIGS. 3 and 4, upon initiation of rearward device displacement, initiation of messenger cable passage over the serrated element 56 causes the serrated element to be angularly displaced counterclockwise to wedge or clamp the messenger cable 12 against the interior bight surface of flange 46 thereby producing one-way locking action or braking. It is to be emphasized that this motion arresting is automatic and requires no manual assistance whatsoever. Upon the exertion of a forward pulling force on towrope 20, the serrated element 56 loosens its grip upon messenger cable 12 and permits free movement of the towing device along the messenger line 12 in the forward direction.

A finger lever 64 is suitably attached to the lower marginal edge of the pivotal arm 50, or other convenient location on the arm, for purposes of disengaging the one-way lock device by angular displacement of the serrated element 56 away from the bight portion of flange 46 during insertion and removal of the tow device from the messenger cable 12. Due to the bias action of spring 60, upon release of lever 64, the serrated element 56 once again contacts the messenger cable 12 for oneway locking action.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A cable tow device adapted for travel along a messenger cable when pulled by a towrope to string a signal cable, comprising a framework, said framework including a baseplate having forward and rearward ends, a first cable embracing flange attached to the forward end of the baseplate, a second cable embracing flange attached to the rearward end of the baseplate, and a third cable embracing flange positioned intermediate the first and second flanges in contact with the messenger cable, said first, and second flanges mounting roller assemblies for engaging the messenger cable, the forward end of the baseplate including means for attaching the towrope thereto, and the rearward end of the baseplate including means for connecting the signal cable to the framework, the towrope attaching means and the means for connecting the signal cable having swivel connectors, and one-way locking means for automatically clamping the messenger cable in response to removal of tension from the towrope preventing rearward displacement along the messenger cable, said one-way locking means including a gripping element pivotally mounted by the framework, and bias means for urging the element into contact with the third cable embracing flange.

2. The device set forth in claim 1 together with a release lever attached to the gripping element, depression of the lever causing displacement of the element away from the third flange to permit insertion and removal of the device from the messenger cable.

3. The device set forth in claim 1 wherein the gripping element includes an arm pivotally connected to the baseplate, and a serrated arcuate rim connected to the arm to clamp the messenger cable against the third flange.

4. In combination with a messenger cable from which a signal cable is to be strung, a cable towing device adapted to be pulled along the messenger cable in a forward direction by a towrope comprising a frame, roller support means engageable with the messenger cable at longitudinally spaced locations for suspending the frame therebelow, cable embracing means fixedly mounted by the frame for contact with the messenger cable between said longitudinally spaced locations, one-way locking means mounted by the frame for clamping the messenger cable against the cable embracing means preventing relative movement in a rearward direction only opposite to the forward direction in which the towing device is pulled by the towrope, and connecting means for anchoring the signal cable to the frame rearwardly of the one-way locking means.

5. The combination of claim 4 wherein said one-way locking means includes a pivoted arm, means depending from the frame for pivotally mounting the arm below the frame, the frame having a slot through which the arm projects upwardly toward the cable embracing means, a cable gripping element fixed to the arm, spring means connecting the arm to the frame for biasing the gripping element into wedging engagement with the messenger cable, and release means for selectively displacing the arm against the bias of the spring means.

6. The combination of claim 5 wherein said roller support means includes a pair of inverted channel formations through which the messenger cable extends, each of said channel formations having leg portions straddling the messenger cable and interconnected by a web, at least one roller rotatably mounted by the leg portions of each of the channel formations projecting through slots formed in the webs thereof into engagement with the messenger cable, the leg portions of the channel formations on one lateral side of the messenger cable having extensions connected to the frame and extending forwardly and rearwardly thereof.

7. The combination of claim 4 wherein said roller support means includes a pair of inverted channel formations through which the messenger cable extends, each of said channel formations having leg portions straddling the messenger cable and interconnected by a web, at least one roller rotatably mounted by the leg portions of each of the channel formations projecting through slots formed in the webs thereof into engagement with the messenger cable, the leg portions of the channel formations on one lateral side of the messenger cable having extensions connected to the frame and extending forwardly and rearwardly thereof.